United States Patent [19]

Moribe et al.

[11] Patent Number: 4,766,509
[45] Date of Patent: Aug. 23, 1988

[54] MAGNETIC HEAD ASSEMBLY

[75] Inventors: Yoshihiro Moribe, Chigasaki; Masataka Fujii, Minamiashigara; Akira Chuma, Odawara; Hiroshi Tsuchiya, Ninomiya, all of Japan

[73] Assignee: Hitachi, Ltd., Tokyo, Japan

[21] Appl. No.: 917,052

[22] Filed: Oct. 9, 1986

[30] Foreign Application Priority Data

Oct. 14, 1985 [JP] Japan ................................ 60-226711

[51] Int. Cl.$^4$ .......................... G11B 5/55; G11B 21/08
[52] U.S. Cl. ..................................... 360/106; 360/109
[58] Field of Search ............................... 360/104–106, 360/109

[56] References Cited

U.S. PATENT DOCUMENTS 4,383,283 5/1983 Machut ........................... 360/109 X
4,423,449 12/1983 Hasegawa ....................... 360/105 X

FOREIGN PATENT DOCUMENTS 58-53278 9/1983 Japan .................................... 360/109

Primary Examiner—A. J. Heinz
Attorney, Agent, or Firm—Fay, Sharpe, Beall, Fagan, Minnich & McKee

[57] ABSTRACT

First and second magnetic heads, or magnetic head sliders containing these heads, which are brought into contact with a magnetic disc on its both sides so as to record and reproduce information signals, are respectively supported by first and second swing arms. The first and second swing arms are respectively supported by first and second elastic bodies. The swing arms are respectively provided with first and second adjusting screws for adjusting the movable range of the swing arms. The first adjusting screw operates to adjust the pressure of a first spring supported by the first arm and the position of the first magnetic head. The second adjusting screw operates to locate the associated second magnetic head to a position which is adjusted to the thus-adjusted position of the first magnetic head.

7 Claims, 4 Drawing Sheets

MAGNETIC HEAD ASSEMBLY

BACKGROUND OF THE INVENTION

The present invention relates to a magnetic head assembly for the recording and reproducing of information signals, and more particularly to a magnetic head assembly of this kind for use in a flexible disc apparatus handling a flexible recording medium, which is suitable for obtaining a stable contact condition between the medium and the magnetic head and for greatly reducing the risk of damage to the medium.

A conventional flexible disc driving apparatus shown in FIG. 1 has a magnetic head assembly 1 which contains magnetic heads and is supported by guide rails 2. The apparatus is constructed so that the assembly 1 is movable in the radial direction (in the direction indicated by arrows (A) of a disc 3 and relative thereto by the operation of a stepping motor 5, through a pulley mounted on the end of the motor 5 and a band 7 wound around the pulley 6. The disc 3 has tracks 4 for recording information in a concentric manner.

In the above apparatus, information signals are magnetically recorded on the tracks 4 of the disc 3 (by magnetization inversion recording) in the following manner: the disc 3 is rotated by a motor (not shown in the drawing) in the direction indicated by the arrow B; the magnetic head is moved to a desired track on the disc 3; and the magnetic head is pressed against the disc 3, thereby performing recording.

The reading (reproduction) of the thus-recorded information is carried out by obtaining information signals which have been magnetically recorded on the disc 3 in the form of voltages induced in coils arranged in the magnetic heads. It is well known to carry out reproduction in this manner, so specific illustration of this operation will be omitted.

The magnetic head 13a, 13b serves as a converter which performs the recording or reproduction of the information. FIG. 2 shows a section through the entire structure of the magnetic head assembly.

Referring to FIG. 2, a slider 12a, in which a core (an element corresponding to that indicated by reference number 25a or 25b in FIG. 4) and a winding of a magnetic head are embedded, is mounted on a swing arm 9a by being elastically supported by a gimbal 11a and a load-spring 10a. The swing arm 9a is supported by a support spring 16a on a carriage 8 forming a main body of the magnetic head assembly and is urged toward a stopper portion 8a provided at the end of the carriage 8 by a pressure-spring 14a. A second slider 12b in which a core and a winding of a magnetic head are embedded, has substantially the same structure as that of the first slider 12a, except that the second slider 12b is additionally provided with a hook 20 formed on a swing arm 9b. The swing arms 9a and 9b are provided with cams 19a and 19b, respectively, and their design is such that, when the hook 20 is lifted, the swing arms 9a and 9b are opened by the cams 19a and 19b, thus providing a gap between the sliders 12a and 12b. This design ensures that the disc 3 and a jacket (an element corresponding to that generically indicated by reference number 23 in FIG. 4 hereinafter referred to) of the flexible disc cartridge can be inserted into the gap between the sliders 12a and 12b.

FIG. 3 shows the structure of the swing arm 9b. Reference numbers in FIG. 3 indicate the same elements as those shown in FIG. 2, and a detailed explanation of the elements will be omitted.

The conventional magnetic head assembly having the structure described above suffers from the following problems when a flexible disc cartridge is mounted therein in operation. FIG. 4 is a view showing the magnetic head sliders 12a and 12b in an example of the state in which they are pressed against the disc 3, taken from the center of the disc 3 shown in FIG. 1. In FIG. 4, the symbol H represents the height of a level 102, at which the sliders 12a and 12b are in contact with each other, above the center of the guide rails 2. The symbol h represents the dimension between the center of the guide rails 2 of the chassis on which the magnetic head assembly 1 and the stepping motor 5 are mounted and a reference level 21 at the lower surface of a jacket sheet 23a pressed against another jacket sheet 23b via the disc 3, as shown in the lefthand side of FIG. 4. The reference level 21 is used as a reference for determining the position of the disc 3. The symbol t represents the sum of thicknesses of the jacket sheet 23a and a liner 24a. The difference $\Delta H$ between the height H of the contact level 102 between the sliders 12a and 12b and the height of the lower surface of the disc 3 (the height above the reference level 21 of which is equal to the thickness t), respectively measured from the center 2a of the guide rails 2, can be expressed by the following equation (1):

$$\Delta H = H(h+t) \tag{1}$$

This difference $\Delta H$ is called the head penetration, and, in general, it should preferably have a value within the range of 0.2 to 0.3 mm. However, in the structure of the magnetic head shown in FIG. 2, since the sliders 12a and 12b are pressured by the load-springs 10a and 10b respectively, the position of the contact level 102 between the sliders 12a and 12b is balanced at a position which varies with the balance between the urging forces of the load-springs 10a and 10b. This means that it is difficult to obtain a prescribed dimension, i.e., the above-mentioned height H, of the contact level 102, unless the forces of the load-springs 10a and 10b are made to be exactly the same as each other in their manufacture. Therefore, as shown in FIGS. 5(a) and 5(b), deviations in the height of the contact level 102 occur. More specifically, a deviation in a height Ha from the prescribed dimension H by an amount $\delta a$ as shown in FIG. 5(a), or a deviation in a height Hb therefrom by an amount $\delta b$, as shown in FIG. 5(b), occurs. This deviation amount 6a or 6b means that the difference $\Delta H$ can not always be brought within the above generally-preferred range of 0.2 to 0.3 mm. As a result, the head penetration becomes excessive (because of the amount $\delta a$) or insufficient (because of the amount $\delta b$), causing unstable contact between the magnetic head cores 25a and 25b and the disc 3 with slight gaps intervening. This leads to the problem of a significant deterioration in the recording characteristics of the apparatus. More specifically, although, as shown in FIG. 6(a), the reproduction output should have a constant, flat envelope of amplitude (shown in terms of voltage in FIGS. 6(a) to (c)) of its reproduced signals, short-term oscillations (indicated by reference number 26 in FIG. 6(b), partial drops (indicated by reference number 27 in FIG. 6(b)), or drops in the reproduction output (shown at 28 in FIG. 6(c)) can occur, reducing the reliability of the apparatus in the recording of information signals. In addition, because of the unstable contact between the cores 25a and 25b and the disc 3, the contact between the sliders 12a and 12b and the disc 3 also becomes unstable, often leading to another problem concerning damage to the disc 3.

U.S. Pat. No. 4,089,029 and Japanese Patent Laid-Open No. 51-124910 disclose conventional known magnetic head assemblies of the type described above.

SUMMARY OF THE INVENTION

It is an object of the present invention to eliminate the above problems, and to provide a magnetic head assembly for use in a flexible disc apparatus which is capable of maintaining the contact between the magnetic head and the disc in a stable condition and of preventing the risk of damage to the disc, and which thus provides a high level of reliability in the recording of information.

The magnetic head assembly in accordance with the present invention is characterized in that the deflection of one or both of a pair of opposite springs applying pressure to a pair of opposite magnetic head sliders accommodating magnetic heads is adjusted, so that the balance point of the contact position between the head sliders can be balanced with an appropriate pressure and at an appropriate contact position.

DETAILED DESCRIPTION OF THE PREFERRED EMBODIMENT

An embodiment of the present invention will be described below with reference to FIGS. 7 and 8.

Figure 7:
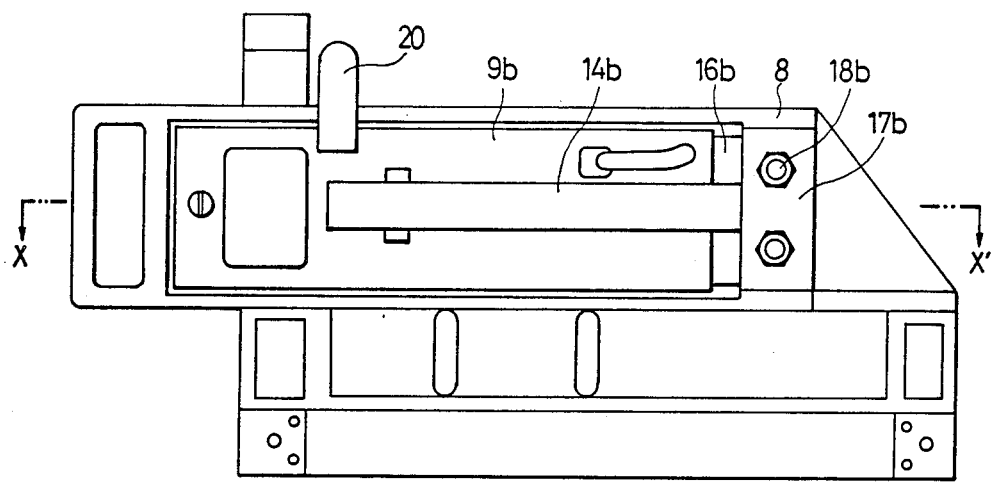
FIG. 7 is a plan view of a magnetic head assembly in accordance with the present invention.

FIG. 7 is a plan view of the upper side of a magnetic head assembly in accordance with the invention. FIG. 7 shows a carriage 8, a swing arm 9b, a pressure-spring 14b, a support spring 16b, a plate 17b for holding the support spring 16b, a bolt 18b for fixing the support spring 16b to the carriage 8 through the holding plate 17b, and a hook 20. Details of the structure of the above elements are shown in FIG. 8.

Figure 8:
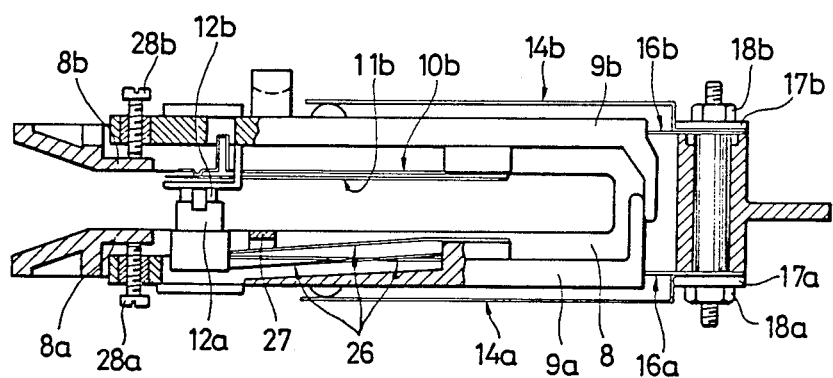
FIG. 8 is a sectional view through the magnetic head assembly of FIG. 7, taken along the line X-X' in FIG. 7.

FIG. 8 shows the internal structure of the head assembly, at a section taken along the line X-X' in FIG. 7. Sliders 12a and 12b each contain a core and a winding of a magnetic head, and one of the sliders (the slider 12a in the illustrated embodiment) is supported by a parallel spring assembly 26 and is mounted on a swing arm 9a. The swing arm 9a has a stopper 27 which limits the position of the arm 9a when the slider 12a is not loaded. This swing arm 9a is mounted on the carriage 8 by members such as a support spring 16a, a holding plate 17a for the spring 16a, and a bolt 18b.

Figure 1:
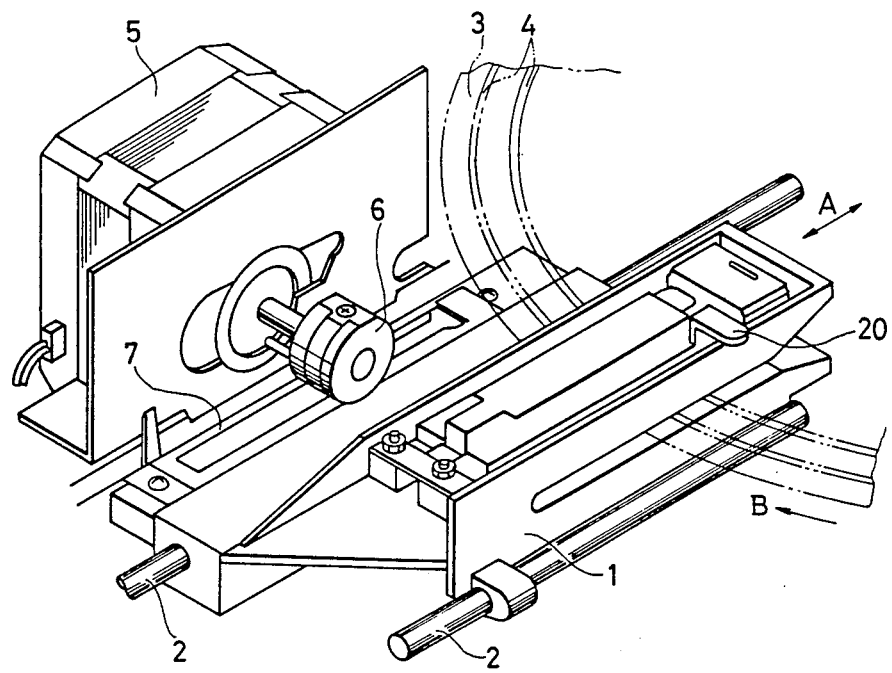
FIG. 1 is a perspective view of the essential parts of a conventional magnetic disc driving apparatus, schematically showing the operation of the apparatus.
Figure 2:
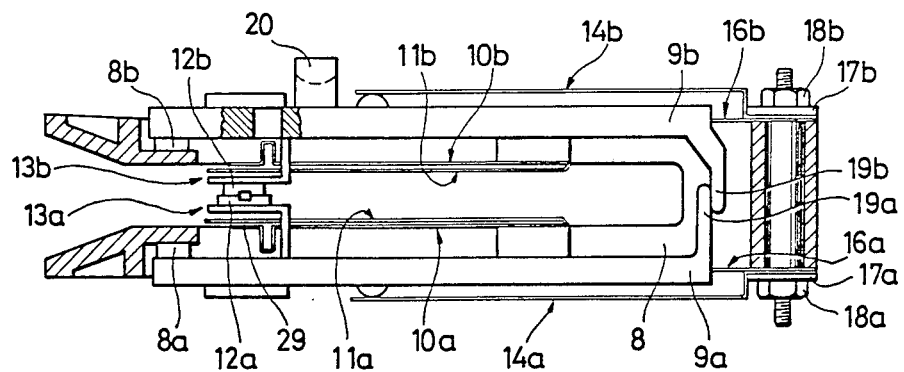
FIG. 2 is a sectional view through a conventional magnetic head assembly, showing the structure of the head assembly.
Figure 3:
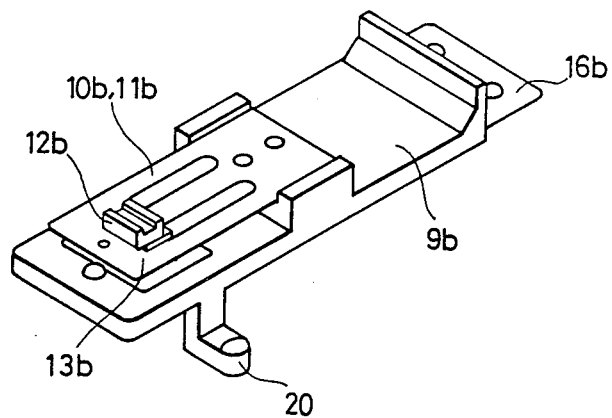
FIG. 3 is a perspective view of the assembly of a swing arm of the head assembly shown in FIG. 2, showing the structure of part of the swing arm assembly.
Figure 4:
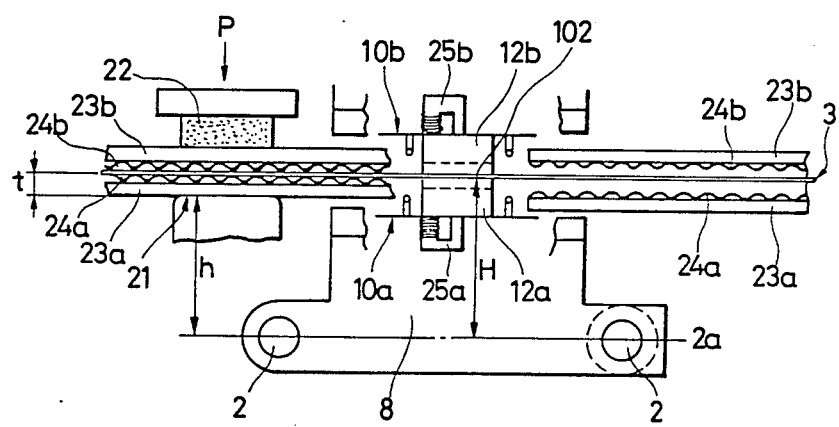
FIG. 4 is a sectional view through the essential parts of a magnetic head assembly, showing the operation of the head medium.
Figure 5A:
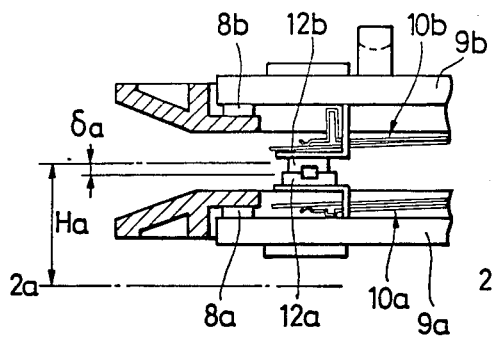
FIGS. 5(a) and 5(b) are sectional views through the essential parts of a magnetic head assembly showing the operation thereof.
Figure 5B:
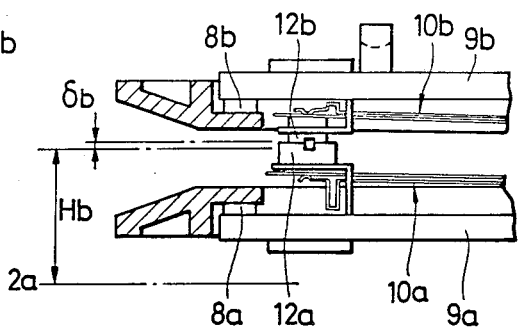
Figure 6A:
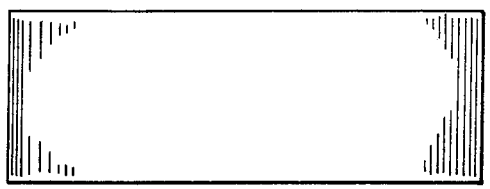
FIGS. 6(a), (b), and (c) are views showing envelopes of reproduction waveforms varied by the magnetic head location shown in the FIG. 5.
Figure 6B:
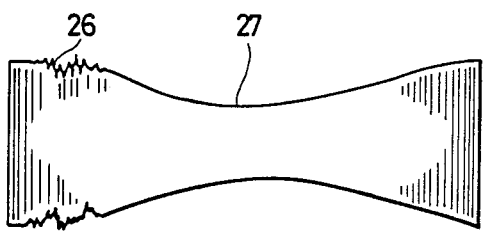
Figure 6C:
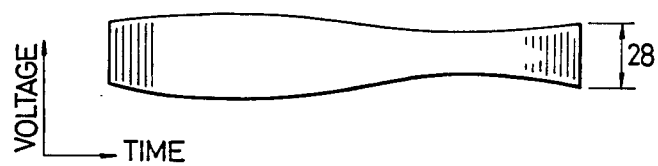

The end of the swing arm 9a is urged toward a stopper portion 8a of the carriage 8 by a pressure-spring 14a. A screw 28a is provided in an end portion of the swing arm 9a. This screw 28a is in contact with the stopper portion 8a of the carriage 8, and is capable of limiting and adjusting the position of the swing arm 9a when it is urged toward the carriage 8. The other slider 12b is mounted on the swing arm 9b by a gimbal 11b and a load-spring 10b, while the swing arm 9b is mounted on the carriage 8 by the support spring 16b, the plate 17b for holding the spring 16b, and the bolt 18b, and is urged toward the carriage 8 by the pressure-spring 14b in the same way as in the conventional head assembly shown in FIG. 2.

As shown in FIG. 8, the end of the swing arm 9b is provided with a screw 28b capable of adjusting the position of the arm 9b relative to the carriage 8. Therefore, by adjusting the position of the swing arm 9b by means of the screw 28b, the deflection of the load-spring 10b can be varied, so that the pressure applied to the slider 12b by the load-spring 10b can be adjusted. Needless to say, the disc 3 (not shown) is inserted between the sliders 12a and 12b, which are brought into contact with the corresponding sides of the disc 3, for the recording and reproduction of information.

In the manufacture of the above magnetic head assembly, the swing arm assemblies are mounted on the carriage in the following manner. First, one of the with the slider 12a, etc., assembled thereon, is mounted on the carriage 8 by means of the support spring 16a, the holding plate 17a for the spring 16a, and the bolt 18a. The screw 28a is adjusted so that the height of the level at which the sliders 12a and 12b are in contact with each other, above a reference position on the carriage 8, for example above the center of the guide rails 2, is at the prescribed height of H (when the disc 3 is inserted between the sliders 12a and 12b, this contact level almost corresponds to the level of the disc 3). In this adjustment, a certain necessary load is applied to the slider 12a beforehand, at its contact surface with the disc 3, by means of an external jig, not shown. Next, the other swing arm assembly, including the swing arm 9b is assembled on the carriage 8. At this stage, the screw 28b can be turned to adjust the position of the surface of the slider 12b to match the surface of the slider 12a which contains a magnetic head and which has had the spring pressure applied to it and its position adjusted, as described above, so that the contact level between the sliders 12a and 12b is at the prescribed height H. This arrangement is hereinafter called "the adjusting arrangement". incidentally, the swing arm assembly, including the arm 9b, may be first assembled on the carriage 8.

Although in the above structure, the slider 12a mounted on the swing arm 9a is supported by the parallel spring 26, this is not limitative. Alternatively, the combination of the gimbal 11a and the load-spring 10a may be used as the support means, in the same way as in the conventional head assembly shown in FIG. 2. However, with this alternative arrangement using a gimbal and a load-spring, since the slider 12a is cantilevered from a support point 29 of the load-spring 10a in accordance with the displacements of the spring 10a, the alignment angle of the slider 12a will vary, thus making the work of the adjusting arrangement difficult and inaccurate.

Further, although in this embodiment both the swing arms 9a and 9b are provided with adjusting screws 28a and 28b, this is not limitative. Alternatively, a single adjusting screw for adjusting the height of the contact level to the prescribed height H may be used, provided that the design is such that the pressure load on the disc can be brought within the allowable range during manufacture without necessitating any further adjustment. The adjusting screw or screws may be provided on one or both of the stopper portions 8a and 8b of the carriage 8, instead of on the swing arm or arms as in the above embodiment. In the former case, if a spacer means or the like is used for adjusting the height H, the same effect as that described above can be achieved.

As described above, in a magnetic head assembly in accordance with the invention, since the dimension of the level of magnetic head sliders relative to a reference position on a carriage (e.g., the center of guide rails) can be suitably adjusted, it is possible to set the head penetration to within a narrow range, as well as to adjust the load, thereby obtaining a stable output of an apparatus which records and reproduces an information signal, and a long effective lifetime of the disc, when the magnetic assembly is mounted in the apparatus.

What is claimed is:

1. A magnetic head assembly for use with a magnetic disc in the recording and reproduction of information signals, the head assembly to be mounted for radial movement relative to the disc on guide means for defining a relatively fixed reference plane parallel to and spaced from the magnetic disc; said magnetic head assembly comprising:
   a first magnetic head portion and a second magnetic head portion, each having a slider surface to be brought into contact with respective sides of the magnetic disc;
   a carriage;
   a first swing arm and a second swing arm supporting said first and second magnetic head portions, respectively;
   a first elastic body and a second elastic body supporting said first and second swing arms, respectively on said carriage for movement of each of said swing arms toward and away from the other in a vertical direction relative to the magnetic disc;
   stoppers disposed to limit a movable range of each of said swing arms in the vertical direction;
   first and second spring means on said first and second swind arms respectively for biasing said first and second magnetic head portions generally vertically toward one another and in contact with each other to define a plane of contact between the sliders in the absence of an interposed magnetic disc and to establish a distance in the vertical direction between said reference plane and said plane of contact; and
   adjusting means for separately adjusting said biasing of at least one of said first and second spring means while holding the biasing of the other of said spring means fixed and for correspondingly adjusting said vertical distance between said plane of contact and said reference plane when said sliders contact one another in the absence of an interposed magentic disc.

2. A magnetic head assembly for use in the recording and reproduction of information signals as claimed in claim 1, wherein said adjusting means is provided on at least one of said swing arms.

3. A magnetic head assembly for use in the recording and reproduction of information signals as claimed in claim 1, wherein said adjusting means is composed of at least one adjusting screw provided on one of said swing arms at an end portion thereof.

4. A magnetic head assembly for use in the recording and reproduction of information signals as claimed in claim 1, wherein said adjusting means includes: means for varying deflection of said first elastic body supporting said first swing arm, for adjusting head pressure of said first elastic body for the swing arm supporting said first magnetic head portion and the position of said first magnetic head portion, and for adjusting the pressure applied to said first magnetic head portional and means locating said second magnetic head portion at a position that is adjusted to the thus-adjusted position of said first magnetic head portion.

5. A magnetic head assembly for use in the recording and reproduction of information signals as claimed in claim 4, wherein said adjusting means is formed of at least one screw provided on at least one of said swing arms at an end portion thereof.

6. In a magnetic head assembly for use to be mounted on a relatively fixed guide for radial movement toward and away from a magnetic disc along a relatively fixed guide defining a reference plane, wherein the head assembly includes a carriage for mounting on and movement along the guide in the radial direction, opposed swing arms movably mounted on the carriage respectively for movement toward and away from each other in a vertical direction to place the swing arms on opposite sides of the disc, magnetic head portions each including a slider mounted on each of the swing arms so that the sliders are aligned with each other to contact opposite sides of the magnetic disc, respectively, and first and second spring means for biasing each slider axially toward the opposed slider and in contact with the opposed slider in the absence of a magnetic disc being between the sliders to define a plane of contact and to establish a distance in the vertical direction between the reference plane and the plane of contact between the sliders without the magnetic disc, wherein the improvements comprises:
   adjusting means for separatively adjusting the biasing of one of said spring means while holding the biasing of the other of said spring means fixed and for correspondingly adjusting the distance in the vertical direction between the plane of contact and said reference plane and further for adjusting the contact pressure between each of said sliders and the magnetic disc.

7. The magnetic head assembly according to claim 6, wherein said means for adjusting includes a screw adjustably mounted between each of said swing arms and said carriage for adjustably fixing movement of the corresponding swing arm relative to the cariage toward the other swing arm without limiting axial movement of the swing arm in the opposite direction; and said spring means further including a spring mounting between each swing arm and the corresponding slider for biasing the slider away from the swing arm and toward the opposite slider.

* * * * *